(12) United States Patent
Lim

(10) Patent No.: US 10,746,229 B2
(45) Date of Patent: Aug. 18, 2020

(54) WHEEL BEARING SEALING DEVICE AND MANUFACTURING METHOD THEREFOR

(71) Applicant: ILJIN GLOBAL CO., LTD, Seoul (KR)

(72) Inventor: Jong Keun Lim, Seoul (KR)

(73) Assignee: ILJIN GLOBAL CO., LTD., Seoul (KR)

( * ) Notice: Subject to any disclaimer, the term of this patent is extended or adjusted under 35 U.S.C. 154(b) by 0 days.

(21) Appl. No.: 16/254,979

(22) Filed: Jan. 23, 2019

(65) Prior Publication Data

US 2019/0211876 A1    Jul. 11, 2019

Related U.S. Application Data

(63) Continuation of application No. PCT/KR2017/003679, filed on Apr. 4, 2017.

(30) Foreign Application Priority Data

Jul. 25, 2016    (KR) .................. 10-2016-0094400

(51) Int. Cl.
*F16C 33/78*    (2006.01)
*B60B 27/00*    (2006.01)

(52) U.S. Cl.
CPC .......... *F16C 33/7823* (2013.01); *B60B 27/00* (2013.01); *F16C 33/78* (2013.01);
(Continued)

(58) Field of Classification Search
CPC .... F16C 33/7823; F16C 33/78; F16C 33/783; F16C 33/7833; F16C 2326/02; B60B 27/00; B60B 2380/00
See application file for complete search history.

(56) References Cited

U.S. PATENT DOCUMENTS 8,246,253 B2 *    8/2012    Masui ................ F16C 33/7859
                                             384/484
8,905,645 B2 *   12/2014    Komori ............... F16C 19/186
                                             384/486
(Continued)

FOREIGN PATENT DOCUMENTS

JP    2003336649 A    11/2003
JP    2007040375 A     2/2007
(Continued)

OTHER PUBLICATIONS

International Search Report for PCT/KR2017/003679 dated Jul. 3, 2017.

*Primary Examiner* — Alan B Waits
(74) *Attorney, Agent, or Firm* — Dinsmore & Shohl, LLP; Yongsok Choi, Esq.

(57) ABSTRACT

According to one embodiment of the present disclosure, a sealing device of a wheel bearing may be disposed axially outside of rolling elements and may be mounted between an outer ring and a hub. The sealing device of the wheel bearing may comprise an outer ring slinger mounted on the outer ring, a hub slinger mounted on the hub, and a deviation-preventing protrusion which protrudes from an outer circumferential surface of the hub to hold an axial inner end of the hub slinger when the hub slinger moves inward in an axial direction. The outer circumferential surface of the hub may meet the deviation-preventing protrusion at right angles.

4 Claims, 4 Drawing Sheets

(52) U.S. Cl.
CPC ...... *F16C 33/7833* (2013.01); *B60B 2380/00* (2013.01); *F16C 2326/02* (2013.01)

(56) References Cited

U.S. PATENT DOCUMENTS

| | | | |
|---|---|---|---|
| 9,546,687 B2 * | 1/2017 | Kaiser | F16C 33/805 |
| 9,982,719 B2 * | 5/2018 | Harada | F16C 33/782 |
| 2009/0129717 A1 * | 5/2009 | Fujimura | B60B 27/001 |
| | | | 384/589 |
| 2015/0151574 A1 * | 6/2015 | Barberis | F16C 33/783 |
| | | | 384/486 |

FOREIGN PATENT DOCUMENTS

| | | |
|---|---|---|
| JP | 2013057340 A | 3/2013 |
| JP | 2014240679 A | 12/2014 |
| KR | 1020160074625 A | 6/2016 |

* cited by examiner

PRIOR ART

WHEEL BEARING SEALING DEVICE AND MANUFACTURING METHOD THEREFOR

CROSS-REFERENCE TO RELATED APPLICATION(S)

This application is a continuation of International Application No. PCT/KR2017/003679 filed on Apr. 4, 2017 which claims priority to Korean Patent Application No. 10-2016-0094400 filed on Jul. 25, 2016, the entire contents of which are incorporated herein by reference.

TECHNICAL FIELD

The present disclosure relates to a sealing device of a wheel bearing and a method for manufacturing the same, and more particularly to a sealing device of a wheel bearing that the sealing device is prevented from being deviated from a mount position thereof and a method for manufacturing the same.

BACKGROUND ART

Generally, a bearing is a device disposed between a rotational element and a nonrotational element to facilitate rotation of the rotational element. Currently, a variety of bearings such as roller bearings, taper bearings, needle bearings, and the like are used.

A wheel bearing is a type of such bearings and rotatably connect a wheel, which is a rotational element, to a vehicle body, which is a nonrotational element. A wheel bearing comprises an inner ring (and/or a hub) connected to one of a wheel and a vehicle body, an outer ring connected to the other of the wheel and the vehicle body, and rolling elements disposed between the outer ring and the inner ring.

Since such a wheel bearing is basically mounted on wheels of a vehicle, a wheel bearing is exposed to foreign substances such as dust, water, and the like. When such foreign substances penetrate into a wheel bearing, particularly, into a portion on which rolling elements are mounted, a raceway that is a polished surface may be damaged. The damaged raceway may generate noise and vibration when the wheel bearing operates and may reduce a lifespan of the wheel bearing. Accordingly, sealing devices for preventing a penetration of foreign substances from the outside and preventing a leakage of grease and the like, which fills the raceway for lubrication of rolling elements, are mounted on one end or both ends of the wheel bearing.

The sealing device includes a slinger mounted on a hub, an outer ring, or an inner ring and a lip having a shape of protruding from the slinger and being mounted on the slinger, and performs a sealing function of sealing a gap between the outer ring and the inner ring (and/or the hub) according to shapes of the slinger and the lip. However, when the slinger deviates from an original position of being mounted on the hub, the outer ring, or the inner ring, sealing performance of the wheel bearing sealing device may be deteriorated. Also, when the slinger excessively deviates from the hub, the outer ring, or the inner ring, performance of the wheel bearing itself is adversely influenced.

Particularly, in a vehicle that a wheel is connected with the hub (and/or the outer ring), the hub (and/or the outer ring) may be instantaneously or continuously deformed by a load and a shock directly transferred to the wheel from the ground or transferred to the wheel according to a driving environment, and thus the slinger mounted on the hub (and/or the outer ring) may deviate from an original mounting position.

FIG. 1 illustrates a schematic structure of a conventional wheel bearing, and FIG. 2 illustrates a partial enlarged view of FIG. 1.

As shown in FIGS. 1 and 2, a slinger 5 press fitted on a hub 3 in a conventional wheel bearing 1 is press fitted on the hub 3 to be held by a protrusion 7 of a curved surface.

Accordingly, the slinger 5 press fitted on the hub 3 in a conventional wheel bearing 1 may go over the protrusion 7 of the curved surface by a vibration caused by operation of the wheel bearing 1 and an axial load from an external force generated by driving of the vehicle, and may deviate from an original mounting position.

SUMMARY

The present disclosure is directed to providing a sealing device of a wheel bearing which is capable of preventing a deviation of a slinger, which is mounted on a hub (and/or an outer ring) where a wheel is connected and forms a sealing device, and a method for manufacturing the same.

According to one embodiment of the present disclosure, a sealing device of a wheel bearing may be disposed axially outside of rolling elements and may be mounted between an outer ring and a hub. The sealing device of the wheel bearing may comprise an outer ring slinger mounted on the outer ring, a hub slinger mounted on the hub, and a deviation-preventing protrusion which protrudes from an outer circumferential surface of the hub to hold an axial inner end of the hub slinger when the hub slinger moves inward in an axial direction. The outer circumferential surface of the hub may meet the deviation-preventing protrusion at right angles.

According to one embodiment of the present disclosure, the hub slinger may comprise a hub press fitted portion press fitted on a hub slinger press fitted surface that is the outer circumferential surface of the hub surrounded by the outer ring, and the deviation-preventing protrusion may be formed to hold an axial inner end of the hub press fitted portion.

According to one embodiment of the present disclosure, the deviation-preventing protrusion may be disposed to be spaced a certain distance apart from the axial inner end of the hub press fitted portion.

According to one embodiment of the present disclosure, the axial inner end of the hub press fitted portion may be disposed to come into contact with the deviation-preventing protrusion.

According to one embodiment of the present disclosure, one surface of the deviation-preventing protrusion for holding the axial inner end of the hub slinger may be formed by lathe-turning operation.

According to one embodiment of the present disclosure, the sealing device may further comprise a hub groove disposed at the axial inner end of the hub slinger and formed by being depressed from the outer circumferential surface of the hub.

According to one embodiment of the present disclosure, the hub groove may comprise a horizontal surface formed to be stepped inward from the deviation-preventing protrusion in a radial direction, a protrusion-connecting surface which extends in the radial direction to connect the horizontal surface to the deviation-preventing protrusion, and a hub outer circumference-connecting surface which extends in the radial direction to connect the horizontal surface to the outer circumferential surface of the hub.

According to one embodiment of the present disclosure, the horizontal surface, the protrusion-connecting surface, and the hub outer circumference-connecting surface may be formed by lathe-turning operation.

According to one embodiment of the present disclosure, the horizontal surface may meet the protrusion-connecting surface at right angles.

According to one embodiment of the present disclosure, there is provided a method for manufacturing a sealing device of a wheel bearing that is disposed axially outside rolling elements in the wheel bearing and comprises a hub slinger mounted on a hub, a deviation-preventing protrusion protruding from an outer circumferential surface of the hub to hold an axial inner end of the hub slinger, and a hub groove adjacent to the deviation-preventing protrusion and depressed from the outer circumferential surface of the hub. The method may comprise lathe-turning operation for the hub groove.

According to one embodiment of the present disclosure, the method may further comprise grinding operation for surfaces of the hub other than the hub groove.

According to one embodiment of the present disclosure, the lathe-turning operation for the hub groove may be performed after grinding operation for the surfaces of the hub other than the hub groove.

According to one embodiment of the present disclosure, the lathe-turning operation for the hub groove may be performed before grinding operation for the surfaces of the hub other than the hub groove.

As described above, according to one embodiment of the present disclosure, a deviation of a hub slinger may be further stably prevented since a hub groove meets a deviation-preventing protrusion at right angles.

Also, a problem of conventional wheel bearings that the hub slinger goes over a structure for preventing the deviation of the hub slinger (such as the deviation-preventing protrusion according to one embodiment of the present disclosure) may be prevented.

Accordingly, sealing performance of the sealing device of the wheel bearing may be ensured, and ultimately, reliability with respect to performance of the wheel bearing itself may be improved.

DETAILED DESCRIPTION

Hereinafter, exemplary embodiments of the present disclosure will be described below in detail with reference to the attached drawings.

Figure 1:
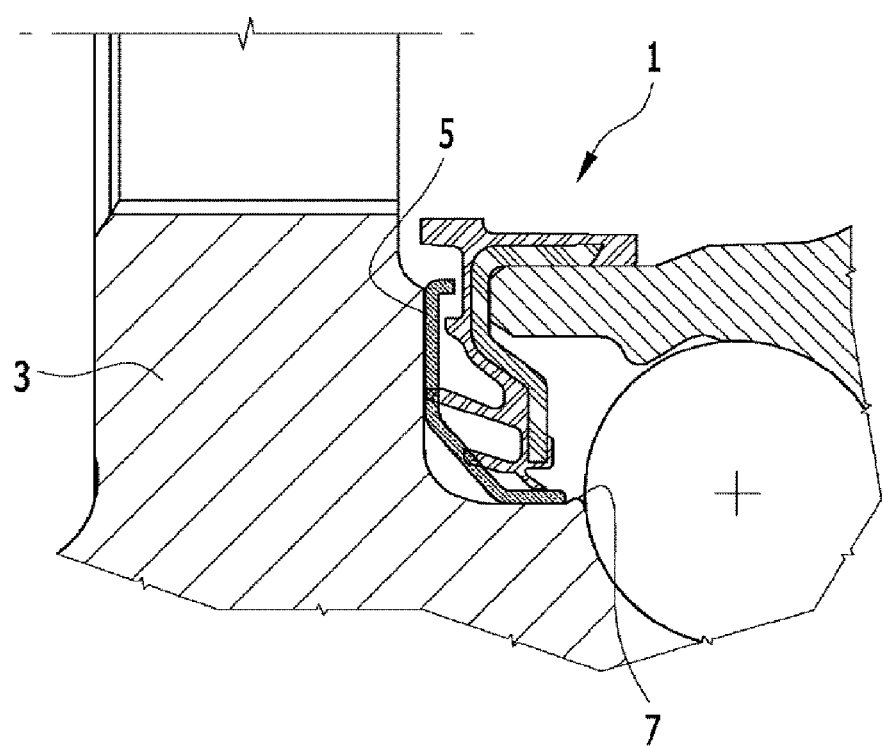
FIG. 1 illustrates a schematic structure of a conventional wheel bearing.
Figure 2:
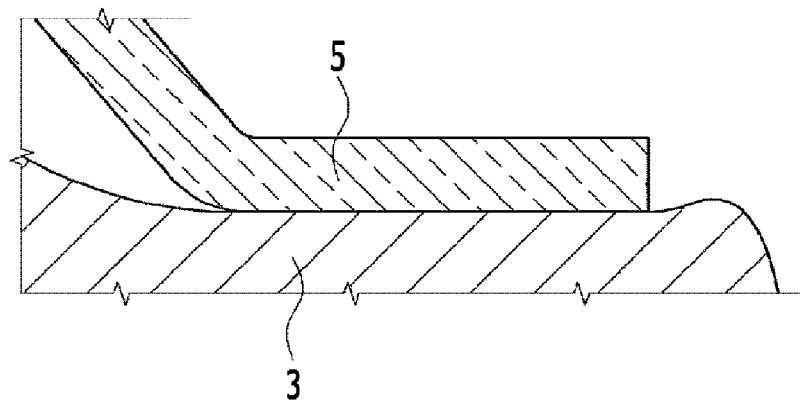
FIG. 2 is a partial enlarged view of FIG. 1.
Figure 3:
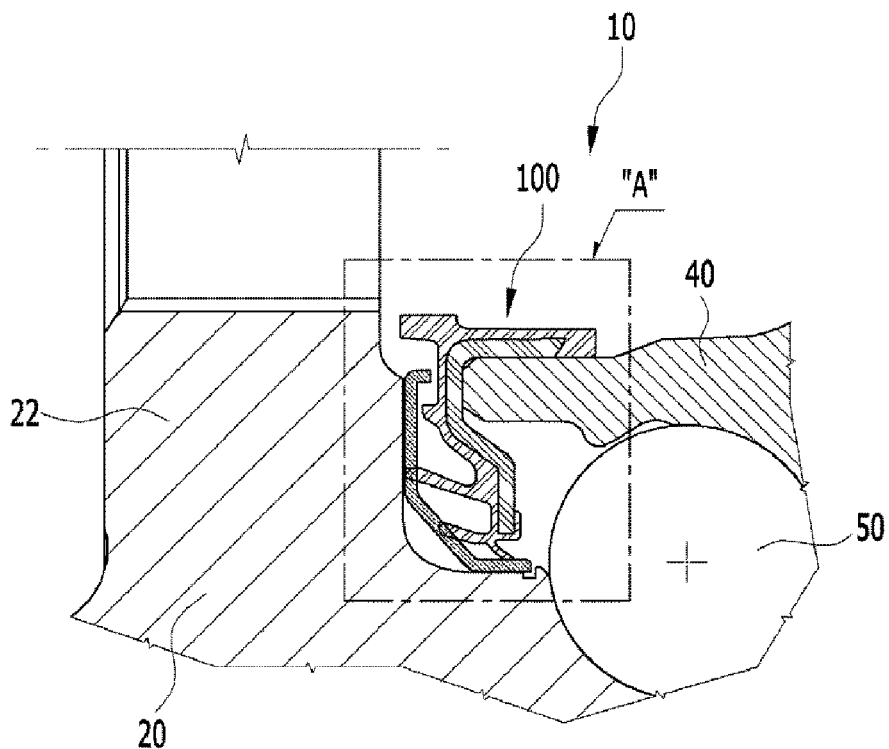
FIG. 3 illustrates a schematic structure of a wheel bearing according to one embodiment of the present disclosure.

FIG. 3 illustrates a schematic structure of a wheel bearing according to one embodiment of the present disclosure.

As shown in FIG. 3, a wheel bearing 10 according to one embodiment of the present disclosure may comprise a hub 20, an outer ring 40, and a rolling element 50 and may further comprise an inner ring (not shown).

In a following description, for convenience of description, a side facing a wheel in an axial direction (a left side in the drawing) is defined as an outside in the axial direction and will be referred to as one side, one end, one end portion, and a designation similar thereto, and a side facing a vehicle body in the axial direction (a right side in the drawing) is defined as an inside in the axial direction and will be referred to as the other side, the other end, the other end portion, and a designation similar thereto.

The hub 20 is connected with a wheel (not shown). Also, the hub 20 comprises a flange 22 integrally formed therewith as a mounting portion for the wheel. In addition, the flange 22 may be formed as a disc shape extending along a circumferential direction of the hub 20.

The outer ring 40 is formed to surround an outer circumferential surface of the hub 20, and the outer circumferential surface of the hub 20 and an inner circumferential surface of the outer ring 40 are disposed to be spaced apart. Also, the outer ring 40 is connected with a vehicle body (not shown).

The rolling element 50 is arranged between the outer circumferential surface of the hub 20 and the inner circumferential surface of the outer ring 40. That is, the rolling element 50 is disposed in a space formed between the outer circumferential surface of the hub 20 and the inner circumferential surface of the outer ring 40 which are spaced apart from each other. Also, the rolling element 50 rotatably connects the hub 20 to the outer ring 40. In addition, a plurality of such rolling elements 50 may be provided, and the plurality of rolling elements 50 may be arranged in multi rows. Meanwhile, the space where the rolling elements 50 are arranged may be filled with grease so as to smoothly drive the wheel bearing 10.

The inner ring may be provided to surround the outer circumferential surface of the hub 20 between the outer ring 40 and the hub 20. Also, the inner ring may come into rolling-contact with at least one of the multi rows of the rolling elements 50.

Generally, a hub or an inner ring of a wheel bearing is connected to one of a wheel and a vehicle body, and an outer ring is connected to the other of the wheel and the vehicle body which is not connected to the hub or the inner ring.

Although the outer ring 40 connected to the vehicle body and the hub 20 connected to the wheel are shown in FIG. 3, the present disclosure is not limited thereto. Also, since a basic structure of the wheel bearing 10 is obvious to one of ordinary skill in the art (hereinafter, referred to as those skilled in the art), a detailed description thereof will be omitted.

The wheel bearing 10 further comprises a sealing device 100. Also, the sealing device 100 is provided to close both ends of the space where the rolling elements 50 are arranged and maintain airtightness thereof. Particularly, at least one sealing device 100 is disposed between the outer ring 40 and the hub 20. In addition, the sealing device 100 prevents a leakage of the grease from the space in which the rolling elements 50 are arranged to the outside or prevents foreign substances from penetrating into the space in which the rolling elements 50 are arranged.

Figure 4:
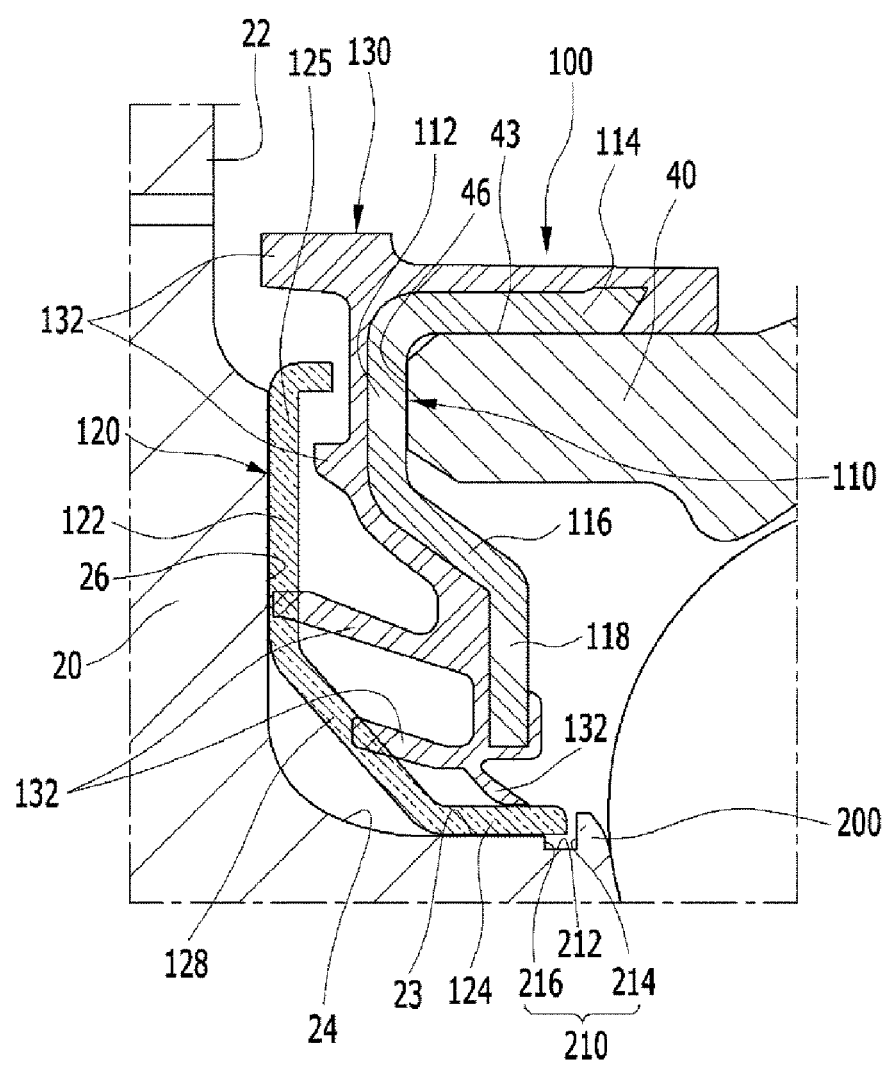
FIG. 4 is an enlarged view of a part A of FIG. 3 and illustrates a schematic structure of a sealing device of a wheel bearing.

FIG. 4 is an enlarged view of a part A of FIG. 3 and illustrates a schematic structure of a sealing device of a wheel bearing.

As shown in FIG. 4, the sealing device 100 comprises an outer ring slinger 110, a hub slinger 120, and a sealing member 130.

The outer ring slinger 110 is a part mounted on one end of the outer ring 40 between the outer ring 40 and the hub 20 and comprises an outer ring contact portion 112, an outer ring press fitted portion 114, a bend extension portion 116, and a radial extension portion 118.

The outer ring contact portion 112 has a radially extending shape and is disposed on an axial outer surface 46 of the outer ring 40. Here, the axial outer surface 46 of the outer ring 40 is an outer ring slinger contact surface 46 which comes into surface-contact with the outer ring slinger 110 when the outer ring slinger 110 is press fitted on the outer ring 40.

The outer ring press fitted portion 114 is bent inward from a radial outer end of the outer ring contact portion 112 in an axial direction and extends to be disposed on an outer circumferential surface 43 of the one end of the outer ring 40. Here, the outer circumferential surface 43 of the one end of the outer ring 40 is an outer ring slinger press fitted surface 43 which is press fitted on the outer ring press fitted portion 114. Also, the outer ring press fitted portion 114 has an inner diameter formed to have a size corresponding to that of an outer diameter of the outer ring slinger press fitted surface 43.

The bend extension portion 116 is bent inward and extends from a radial inner end of the outer ring contact portion 112 in the axial direction. Meanwhile, the bend extension portion 116 may extend to be inclined with respect to the axial direction.

The radial extension portion 118 is bent inward and extends from an axial inner end of the bend extension portion 116 in a radial direction. Here, the radial extension portion 118 extends further toward an outside in the radial direction than an outer circumferential surface 23 of the hub 20 in parallel with the outer ring slinger press fitted surface 43 inside the radial direction. In addition, the outer circumferential surface 23 of the hub 20 in parallel with the outer ring slinger press fitted surface 43 is a hub slinger press fitted surface 23 that is press fitted on the hub slinger 120.

The hub slinger 120 is a part mounted on the hub 20 between the outer ring 40 and the hub 20 and comprises a hub contact portion 122, a hub press fitted portion 124, an axial extension portion 125, and a connection portion 128.

The hub contact portion 122 is disposed to face the outer ring contact portion 112 while being parallel therewith. Also, the hub contact portion 122 comes into surface-contact with and is supported by an axial inner surface 26 of the flange 22 of the hub 20 when the hub slinger 120 is press fitted on the hub 20. Here, the axial inner surface 26 of the flange 22, with which the hub contact portion 122 comes into surface-contact, is referred to as a hub slinger contact surface 26.

The hub press fitted portion 124 is a part on which the hub slinger press fitted surface 23 is press fitted. Also, the hub press fitted portion 124 has an inner diameter formed to have a size corresponding to that of an outer diameter of the hub slinger press fitted surface 23.

The axial extension portion 125 is bent inward and extends from a radial outer end of the hub contact portion 122 in the axial direction. Also, the radial outer end of the hub contact portion 122 extends further inside in the radial direction than the radial outer end of the outer ring contact portion 112. Meanwhile, an extending length of the axial extension portion 125 may be designed by those skilled in the art according to a spatial property between the axial extension portion 125 and the outer ring contact portion 112 so as to increase sealing performance.

The connection portion 128 is formed to connect a radial inner end of the hub contact portion 122 to an axial outer end of the hub press fitted portion 124. Also, in order to allow the hub 20 adjacent to the connection portion 128 to surround the connection portion 128 while being spaced apart therefrom, the hub 20 between the hub slinger contact surface 26 and the hub slinger press fitted surface 23 is formed as a gentle curved surface 24 and the connection portion 128 extends to form a space from the curved surface 24 of the hub 20. Accordingly, an area where the hub slinger 120 receives a load transferred through the hub 20 is reduced, and thus deviation of the hub slinger 120 toward an axial inside is alleviated.

The sealing member 130 is mounted on one of the outer ring slinger 110 and the hub slinger 120. Although the sealing member 130 is shown in FIG. 4 as being mounted on the outer ring slinger 110, the present disclosure is not limited thereto. Also, the sealing member 130 comprises at least one seal lips 132 protruding toward the other on which the sealing member 130 is not provided, the hub 20, or the outer ring 40. In addition, the sealing member 130 may be formed with a rubber material, and the seal lips 132 come into elastic contact with the outer ring slinger 110, the hub slinger 120, the hub 20, or the outer ring 40.

Although shapes of the components of the sealing device 100 may be variously changed according to a design of those skilled in the art, the sealing device 100 of the wheel bearing 10 according to one embodiment of the present disclosure further comprises a hub groove 210 and a deviation-preventing protrusion 200.

The hub groove 210 is formed as being depressed from an outer circumference of the hub slinger press fitted surface 23. Also, the hub groove 210 is disposed at an axial inner end of the hub press fitted portion 124. That is, the outer circumference of the hub slinger press fitted surface 23 where the axial inner end of the hub press fitted portion 124 is located is depressed to form the hub groove 210.

The deviation-preventing protrusion 200 is formed to be stepped from the hub groove 210 at axial inside of the hub groove 210. Also, an outer diameter of the deviation-preventing protrusion 200 is formed to be greater than the inner diameter of the hub press fitted portion 124. Here, the hub groove 210 comprises a horizontal surface 212, a protrusion-connecting surface 214, and a hub outer circumference-connecting surface 216.

The horizontal surface 212 is formed in parallel with the hub press fitted portion 124 and is stepped radially inside with the deviation-preventing protrusion 200. That is, an outer diameter of the horizontal surface 212 is smaller than the inner diameter of the hub press fitted portion 124 and the outer diameter of the hub slinger press fitted surface 23.

The protrusion-connecting surface 214 is a surface formed to radially extend and connects the horizontal surface 212 to the deviation-preventing protrusion 200. Meanwhile, although the protrusion-connecting surface 214 is shown in FIG. 4 to be disposed being spaced a certain distance apart from the axial inner end of the hub press fitted portion 124, the protrusion-connecting surface 214 may come into contact with the hub press fitted portion 124, and such a deviation and contact may be determined according to a design of those skilled in the art for preventing a deviation of a slinger.

The hub outer circumference-connecting surface 216 is a surface formed to radially extend and connects the horizontal surface 212 to the hub slinger press fitted surface 23.

Meanwhile, the protrusion-connecting surface 214 and the hub outer circumference-connecting surface 216 respectively meet the horizontal surface 212 at right angles. Also, to allow the protrusion-connecting surface 214 and the hub outer circumference-connecting surface 216 to meet the horizontal surface 212 at precise right angles, the hub groove 210 may be formed by a lathe-turning operation. Here, the lathe-turning operation refers to a machining process of cutting an workpiece by a cutting tool while rotating the workpiece with a lathe. Since the lather-turning operation is widely known cutting process, a detailed description thereof will be omitted.

Figure 5:
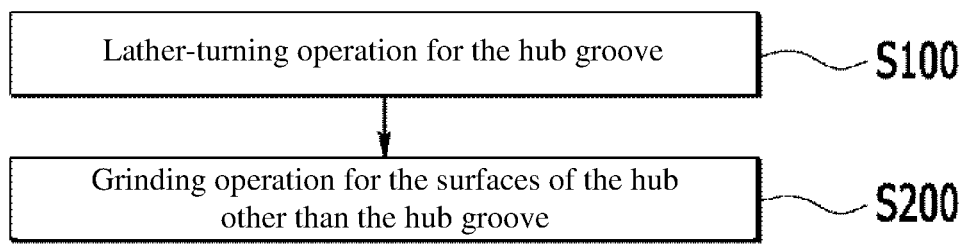
FIG. 5 is a flowchart illustrating a method for manufacturing a sealing device of a wheel bearing according to one embodiment of the present disclosure.
Figure 6:
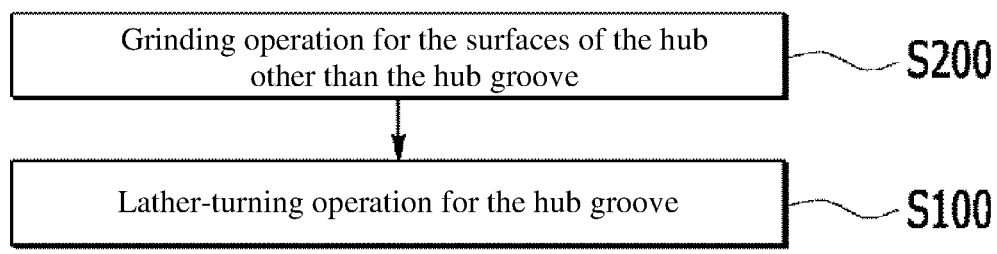
FIG. 6 is a flowchart illustrating a method for manufacturing a sealing device of a wheel bearing according to another embodiment of the present disclosure.

FIG. 5 is a flowchart illustrating a method for manufacturing a sealing device of a wheel bearing according to one embodiment of the present disclosure, and FIG. 6 is a flowchart illustrating a method for manufacturing a sealing device of a wheel bearing according to another embodiment of the present disclosure.

As shown in FIGS. 5 and 6, the methods for manufacturing a sealing device of a wheel bearing according to one embodiment of the present disclosure are methods of machining the surface of the hub 20 on which the hub slinger 120 is mounted and include a lathe-turning operation for the hub groove 210 (S100).

The lathe-turning operation for the hub groove 210 (S100) may be performed before a grinding operation for the hub slinger contact surface 26 of the flange 22, the curved surface 24 of the hub 20, the hub slinger press fitted surface 23, and the like (S200) as shown in FIG. 5 or may be performed after the grinding operation for the hub slinger contact surface 26 of the flange 22, the curved surface 24 of the hub 20, the hub slinger press fitted surface 23, and the like (S200) as shown in FIG. 6.

Meanwhile, it is obvious to those skilled in the art that after the lathe-turning operation for the hub groove 210 (S100) and the grinding operation for the surfaces of the hub 20 other than the hub groove 210, the hub slinger 120 passes the deviation-preventing protrusion 200 and is mounted to come into contact with the hub slinger contact surface 26.

As described above, according to the one embodiment of the present disclosure, the hub groove 210 and the deviation-preventing protrusion 200 are at right angles and thus a deviation of the hub slinger 120 may be further stably prevented. Also, a problem of conventional wheel bearings that the hub slinger 120 goes over a structure for preventing the deviation of the hub slinger (such as the deviation-preventing protrusion 200 according to one embodiment of the present disclosure) may be prevented. Accordingly, sealing performance of the sealing device 100 of the wheel bearing 10 may be ensured, and ultimately, reliability with respect to performance of the wheel bearing 10 itself may be improved.

Although the exemplary embodiments of the present disclosure have been described above, the present disclosure is not limited thereto and includes all modifications from the embodiments of the present disclosure within a range of being easily modified by one of ordinary skilled in the art and acknowledged as being equivalents thereof.

What is claimed is:

1. A sealing device of a wheel bearing which is disposed axially outside of rolling elements and mounted between an outer ring and a hub, the sealing device comprising:
   an outer ring slinger mounted on the outer ring;
   a hub slinger mounted on the hub;
   a deviation-preventing protrusion which protrudes from an outer circumferential surface of the hub to hold an axial inner end of the hub slinger when the hub slinger moves inward in an axial direction; and
   a hub groove depressed from the outer circumferential surface of the hub,
   wherein the hub groove comprising: a horizontal surface disposed radially inside of the outer circumferential surface of the hub; a hub outer circumference-connecting surface extending from an axial outer end of the horizontal surface in a radial direction; and a protrusion-connecting surface extending from an axial inner end of the horizontal surface in the radial direction; and
   wherein an axial outer end surface of the deviation-preventing protrusion is formed together with the protrusion-connecting surface by a same machining process, and the axial outer end surface of the deviation-preventing protrusion and the protrusion-connecting surface are formed as one surface continuously formed in the radial direction,
   wherein the hub slinger comprises a hub press fitted portion press fitted on a hub slinger press fitted surface that is the outer circumferential surface of the hub surrounded by the outer ring,
   wherein the deviation-preventing protrusion is formed to hold an axial inner end of the hub press fitted portion, and
   wherein the deviation-preventing protrusion is disposed to be spaced a certain distance apart from the axial inner end of the hub press fitted portion.

2. The sealing device of claim 1, wherein one surface of the deviation-preventing protrusion for holding the axial inner end of the hub slinger is formed by lathe-turning operation.

3. The sealing device of claim 1, wherein the horizontal surface, the protrusion-connecting surface, and the hub outer circumference-connecting surface are formed by lathe-turning operation.

4. The sealing device of claim 1, wherein the horizontal surface meets the protrusion-connecting surface at right angles.

* * * * *